(No Model.)

C. W. KEMPEL.
LAMP.

No. 511,337. Patented Dec. 26, 1893.

Witnesses
G. T. Myers
E. S. Frye

Inventor
C. W. Kempel
By Hopkins & Atkins
Attorneys

UNITED STATES PATENT OFFICE.

CHARLES W. KEMPEL, OF BELLAIRE, OHIO.

LAMP.

SPECIFICATION forming part of Letters Patent No. 511,337, dated December 26, 1893.

Application filed January 26, 1893. Serial No. 459,842. (No model.)

*To all whom it may concern:*

Be it known that I, CHARLES W. KEMPEL, of Bellaire, county of Belmont, and State of Ohio, have invented certain new and useful Improvements in Lamps, of which the following is a specification, reference being had to the accompanying drawings.

The object of my invention is to produce improved mechanism for adjusting the wicks of miners' lamps, whereby the wick may be adjusted from the upper rearward part of the lamp without displacing it.

Figure 1:
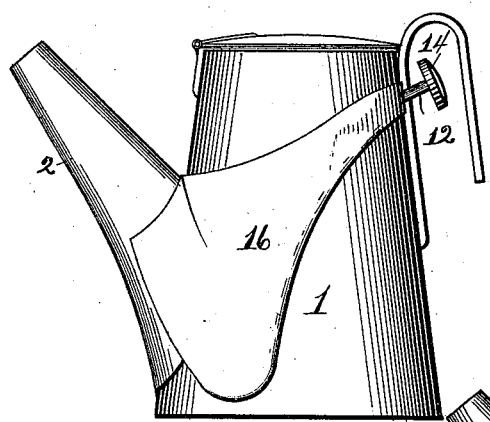
Figure 2:
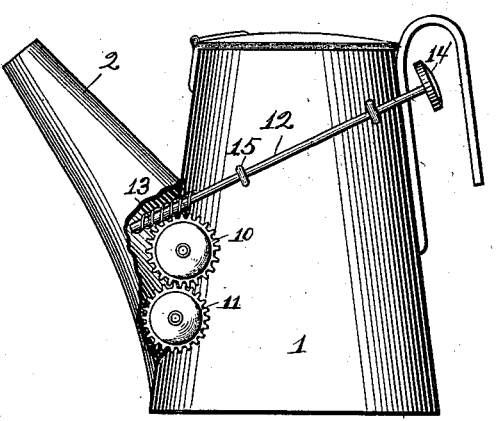
Figure 3:
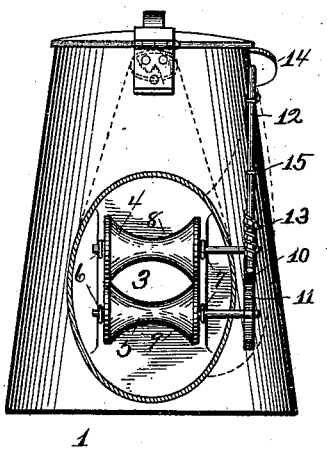
Figure 4:
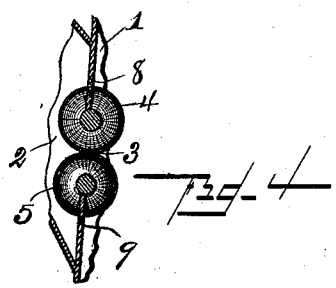

In the accompanying drawings, Figure 1 is a side elevation of my lamp. Fig. 2 is a view of the same, with part of the case removed. Fig. 3 is a front elevation of the lamp, with the burner and part of the case removed. Fig. 4, is a detail sectional view illustrating the arrangement of wick raisers and lips.

Referring to the figures on the drawings, 1 indicates a lamp bowl of any suitable and ordinary construction.

2 indicates the burner.

3 indicates an opening in the front of the bowl with which the burner communicates. Mounted in these openings are wick rollers 4 and 5, preferably concave, as shown.

6 and 7 indicate respective journals of the rollers. They are located so that the lips 8 and 9, respectively, enter the concavities of one of the rollers and prevent the flow of oil, through the burner except between the rollers, which is effectually dammed by the wick, so that only so much oil as is needed passes through the wick to the flame. The journals passing through the sides of the wick tubes slightly in front of the lips, and being closely fitted into the apertures in said tube, the escape of oil is effectually prevented. Upon one end of each journal is securely fastened gears 10 and 11 respectively. These gears mesh with each other, and are adapted to be driven by a shaft 12 having a worm thread 13 on one end, and a thumb-wheel 14 upon the other end.

15 indicates suitable bearings by which the shaft is carried, and which are preferably located so as to direct the shaft obliquely across the side of the bowl.

16 indicates a case or cover secured to the bowl by any suitable means adapted to protect the gears and other mechanism.

All the parts are preferably made of tin, but may be made of any suitable material. The case and burner may also be made of one piece, or of more pieces, as preferred.

What I claim is—

1. In a lamp, the combination with a bowl and opening, of convex lips across the opening, and concave wick rollers located in the opening adjacent, respectively, to the lips, substantially as and for the purpose specified.

2. In a lamp, the combination with a bowl, burner opening located near the bottom of the front thereof, and a wick roller located therein, of roller operating mechanism operatively connected therewith and extending to the top of the rear of the bowl, substantially as specified.

3. In a lamp, the combination with a bowl, burner opening located near the bottom of the front thereof, and a pair of convex rollers, of gears secured to the ends of the rollers meshing with each other, and a worm shaft meshing with the gear and carried in suitable bearings obliquely across the bowl, substantially as specified.

4. In a lamp, the combination with the bowl and wick rollers, of a shaft operatively connected with the rollers and carried in suitable bearings upon the outside of the bowl, and a superimposed shield or cover adapted to protect the shaft and connecting mechanism, substantially as specified.

In testimony of all which I have hereunto subscribed my name.

CHARLES W. KEMPEL.

Witnesses:
  HENRY KEMPEL,
  GEORGE KEMPEL.